United States Patent
Yu

(10) Patent No.: US 6,924,869 B2
(45) Date of Patent: Aug. 2, 2005

(54) DISPLAY PANEL WITH THE INTEGRATED DRIVER CIRCUIT

(75) Inventor: Jian-Shen Yu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 47 days.

(21) Appl. No.: 10/605,162

(22) Filed: Sep. 12, 2003

(65) Prior Publication Data

US 2004/0239862 A1 Dec. 2, 2004

(30) Foreign Application Priority Data

Apr. 29, 2003 (TW) ........................................ 92109962 A

(51) Int. Cl.[7] .......................................... G02F 1/1339
(52) U.S. Cl. ........................ 349/152; 349/149; 349/150; 349/154; 349/189; 345/156; 345/205; 345/206
(58) Field of Search ................................ 349/149, 150, 349/154, 189, 152; 345/156, 205, 206

(56) References Cited

U.S. PATENT DOCUMENTS 6,774,968 B2 * 8/2004 Hagiwara ................... 349/139
2004/0246246 A1 * 12/2004 Tobita ......................... 345/205

* cited by examiner

*Primary Examiner*—Robert H. Kim
*Assistant Examiner*—(Nancy) Thanh-Nhan P Nguyen
(74) *Attorney, Agent, or Firm*—Jiang Chyun IP Office

(57) ABSTRACT

Display panel with the integrated driver circuit, the display panel comprises an isolating array substrate and further comprises a plurality of peripheral areas, a liquid crystal injection hole, display area, gate driver circuit and data driver circuit. This invention disposes the data driver circuit on the adjacent edge of the peripheral area, and disposes the liquid crystal injection hole on one peripheral area which is opposite to one of the adjacent edges. This invention makes it convenient to design the display panel.

13 Claims, 4 Drawing Sheets

DISPLAY PANEL WITH THE INTEGRATED DRIVER CIRCUIT

CROSS REFERENCE TO RELATED APPLICATIONS

This application claims the priority benefit of Taiwan application Ser. No. 92109962, filed on Apr. 29, 2003.

BACKGROUND OF INVENTION

1. Field of Invention

The present invention relates to a display panel, and more particularly, to a display panel with the integrated driver circuit composed of the Low Temperature Poly-Silicon (LTPS) Thin Film Transistor (TFT).

2. Description of Related Art

The Liquid Crystal Display (LCD) is one kind of the panel display. It is classified into the static driving, simple matrix driving, and the active matrix driving types based on various LCD driving methods. The TFT is the mainstream active matrix driving technique and is mainly applied in the notebook computer as well as in the camcorder and image processing products. The Twisted Nematic (TN) and the Super Twisted Nematic (STN) are the mainstream simple matrix driving techniques mainly applied in word processors and consumer products. The active matrix driving LCD is an ideal display apparatus for providing the display effect with high data density.

With the LTPS technique, the horizontal driver circuit and the vertical driver circuit are disposed on the peripheral areas of the display panel,therefore the number of the panel driver ICs and the space occupied by the panel peripheral areas are both reduced, thus the product is advantageous in its low cost and slim edge size. Since the LTPS technique intragrates the driver circuit on the panel peripheral areas, the resolution of such panel is much higher than the resolution provided by the currently used a-Si TFT-LCD.

FIG. 4 schematically shows a conventional display panel with the integrated driver circuit. As shown in FIG. 4, the display panel with the integrated driver circuit 400 comprises an array substrate 402 and further comprises a liquid crystal injection hole 410, a display area 420, a gate driver circuit 430, a data driver circuit 440, a first peripheral area 456, a second peripheral area 454, a third peripheral area 458, and a forth peripheral area 452.

In conventional display panel with the integrated driver circuit 400, the liquid crystal injection hole 410 is disposed on the forth peripheral area 452 of the array substrate 402, the gate driver circuit 430 is disposed on the third peripheral area 458 of the array substrate 402, and no driver circuit is disposed on both the first peripheral area 456 and the second peripheral area 454 of the array substrate 402. The data driver circuit 440 is disposed within a range formed by the liquid crystal injection hole 410 and the display area 420, in other words, the data driver circuit 440 is disposed under the liquid crystal injection hole 410. When the designer of the display panel 400 is designing the integrated driver circuit, the impact caused by the poor configuration of the liquid crystal injection hole 410 and the data driver circuit 440 has to be considered, as, for example, the damage caused by the sealing process of injection hole 410 to the data driver circuit 440 after liquid crystal injection has to be avoided.

In summary, since the liquid crystal injection hole and the data driver circuit of the conventional display panel with integrated driver circuit are disposed on the same side, it is rather inconvenient for the designer when it is under designed.

SUMMARY OF INVENTION

To solve the problem mentioned above, the present invention provides a display panel with the integrated driver circuit. The present invention changes the original design where the liquid crystal injection hole and the data driver circuit are originally disposed on the same peripheral area of any array substrate in the display panel to a new design where the data driver circuit is disposed on the adjacent edge of the first peripheral area and the second peripheral area of the array substrate, and the liquid crystal injection hole is disposed on the fourth peripheral area of the array substrate, so as to avoid inconvenience when the display panel is under design.

The display panel with the integrated driver circuit provided by the present invention comprises an isolating array substrate. The array substrate is a rectangle, and the display panel at least comprises four peripheral areas, a liquid crystal injection hole, a display area, a first driver circuit, and a second driver circuit, wherein the display panel is a LCD panel.

In accordance with a preferred embodiment of the present invention, the four peripheral areas mentioned above form the periphery of the array substrate. The injection hole is a hole where the liquid crystal is injected into and is disposed on the fourth peripheral area of the array substrate, and after the injecting liquid crystal process is completed; the injection hole is sealed with a sealing material.

In accordance with the preferred embodiment of the present invention, the display area mentioned above is composed of a plurality of data lines and a plurality of gate lines that are perpendicularly crossed with each other, and the display area is an active matrix driving display area.

In accordance with the preferred embodiment of the present invention, the first driver circuit is disposed on the adjacent edge of the first peripheral area and the second peripheral area among the four peripheral areas of the array substrate, and the first driver circuit further comprises a plurality of data driver units which drives the data lines corresponded to the display unit, respectively, wherein the first driver circuit is a data driver circuit.

In accordance with the preferred embodiment of the present invention, the second driver circuit mentioned above is disposed on the third peripheral area among the four peripheral areas of the array substrate, and the second driver circuit drives a plurality of gate lines on the display unit, respectively. Optionally, the second driver circuit is disposed on the third peripheral area of the array substrate and part of the first peripheral area where the first driver circuit is not disposed on, wherein the second driver circuit is a gate driver circuit.

In accordance with the preferred embodiment of the present invention, the first driver circuit mentioned above is disposed on either all of the first peripheral area and part of the second peripheral area or part of the first peripheral area and part of the second peripheral area. When the second driver circuit is disposed on the third peripheral area of the array substrate and the part of the first peripheral area where the first driver circuit is not disposed on, it can be partially disposed or fully disposed on the third peripheral area.

The display panel with the integrated driver circuit provided by the present invention disposes the first driver circuit on the first peripheral area and the second peripheral area of the array substrate, and disposes the liquid crystal injection hole on the fourth peripheral area, so as to facilitate the designer of the display panel when designing the circuit.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
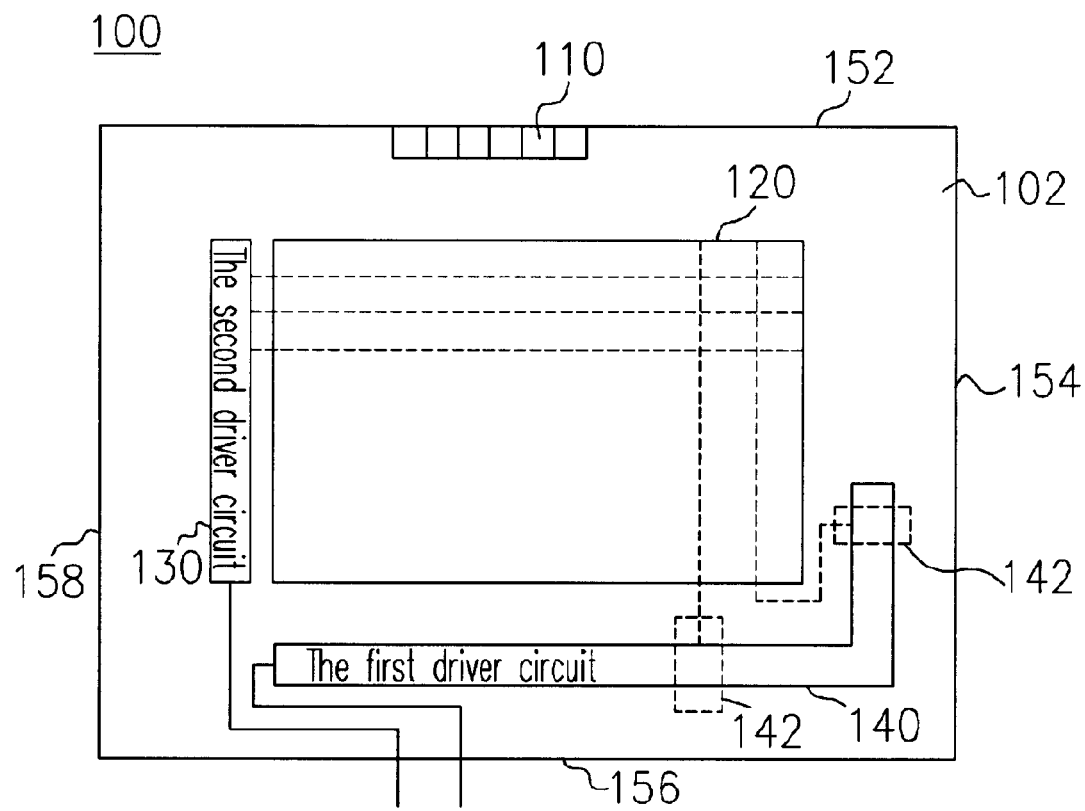
FIG. 1 schematically shows a configuration diagram of a display panel with the integrated driver circuit of a preferred embodiment of the present invention.

Referring to FIG. 1, it schematically shows a configuration diagram of a display panel with the integrated driver circuit of a preferred embodiment of the present invention. As shown in FIG. 1, the display panel with the integrated driver circuit 100 comprises an array substrate 102 wherein the display panel with the integrated driver circuit 100 further comprises a liquid crystal injection hole 110, a display area 120, a second driver circuit 130, a first driver circuit 140, a fourth peripheral area 152, a second peripheral area 154, a first peripheral area 156, and a third peripheral area 158. It will be apparent to one of the ordinary skill in the art that the display panel 100 may be an LCD panel, and the array substrate 102 may be a glass-based substrate. However, it is not necessarily limited to it.

It will be apparent to one of the ordinary skill in the art that the display area 120 may be an active matrix driving display area, however, it is not necessarily limited to it, and after the liquid crystal is injected into the space in the display area formed by the array substrate 102 and another substrate through the liquid crystal injection hole 110, the injection hole 110 is sealed with a sealing material.

Referring to FIG. 1, in the present embodiment, the array substrate 102 is a rectangle, and the display area 120 of the display panel 100 is composed of a plurality of data lines and a plurality of gate lines which are perpendicularly crossed with each other, and it will be apparent to one of the ordinary skill in the art that they are used for controlling the pixel cells in the display area 120. The first driver circuit 140 is disposed on the adjacent edge of the first peripheral area 156 and the second peripheral area 154 of the array substrate 102. As shown in FIG. 1, the first driver circuit 140 on the second peripheral area 154 is only partially disposed on the second peripheral area 154. It will be apparent to one of the ordinary skill in the art that the first driver circuit 140 may be a data driver circuit or a gate driver circuit. However, it is not necessarily limited to it.

In the present embodiment, it is assumed that the first driver circuit 140 is the data driver circuit, and a plurality of data driver units is disposed on the first driver circuit 140, so as to drive a plurality of data lines in the display area 120 through the data driver units 142. In the present embodiment, although only two data driver units 142 are schematically shown in first driver circuit 140, in fact the quantity of the data driver units 142 may be any number.

In the present embodiment, the second driver circuit 130 is disposed on the third peripheral area 158 of the array substrate 102. It will be apparent to one of the ordinary skill in the art that the second driver circuit 130 may be a gate driver circuit, and the second driver circuit 130 is responsible for driving a plurality of gate lines in the display area 120.

In the preferred embodiment of the present invention, the first driver circuit 140 is not disposed in the area formed by the liquid crystal injection hole 110 and the display area 120, and such configuration greatly facilitates the designers of the display panel with the integrated driver circuit when they are designing the circuit.

Figure 2:
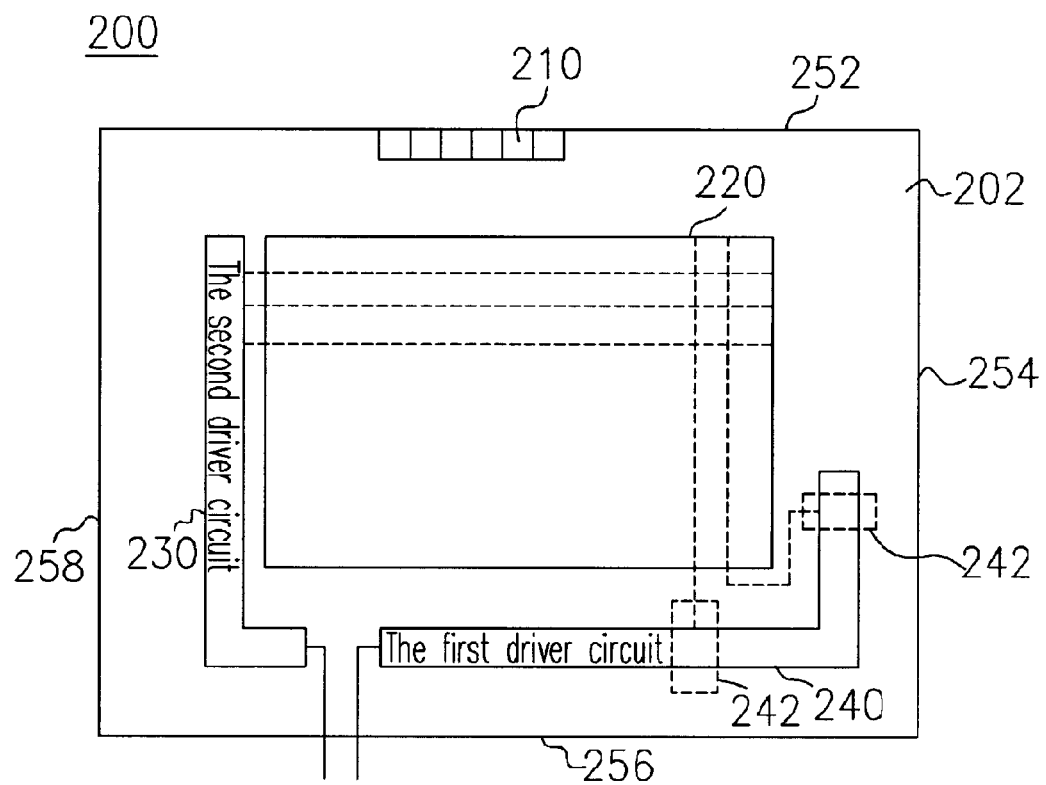
FIG. 2 schematically shows a configuration diagram of a display panel with the integrated driver circuit of another preferred embodiment of the present invention.

Referring to FIG. 2, it schematically shows a configuration diagram of a display panel with the integrated driver circuit of another preferred embodiment of the present invention. As shown in FIG. 2, similarly the display panel 200 comprises an array substrate 202, and also comprises a liquid crystal injection hole 210, a display area 220, a second driver circuit 230, a first driver circuit 240, a fourth peripheral area 252, a second peripheral area 254, a first peripheral area 256, and a third peripheral area 258. It differs from FIG. 1 in the configuration of the first driver circuit 240 and the second driver circuit 230.

Referring to FIG. 2, the first driver circuit 240, such as a data driver circuit, is disposed on part of the first peripheral area 256 and part of the second peripheral area 254 of the array substrate 102. The second driver circuit 230, such as a gate driver circuit, is disposed in two different disposing methods. The first disposing method disposes the second driver circuit 230 on all of the third peripheral area 258 and the first peripheral area 256 where the first driver circuit 240 is not disposed on; and the second disposing method disposes the second driver circuit 230 on part of the third peripheral area 258 and the first peripheral area 256 where the first driver circuit 240 is not disposed on.

In the preferred embodiment of the present invention, when the second driver circuit 230 is disposed on part of the third peripheral area 258 and the first peripheral area 256 where the first driver circuit 240 is not disposed on, the first driver circuit 240 is optionally disposed on all of the second peripheral area 254 and part of the first peripheral area 256 (now shown), and the combination of the disposing method is decided and chosen by the designer of the display panel with the integrated driver circuit 200.

Figure 3:
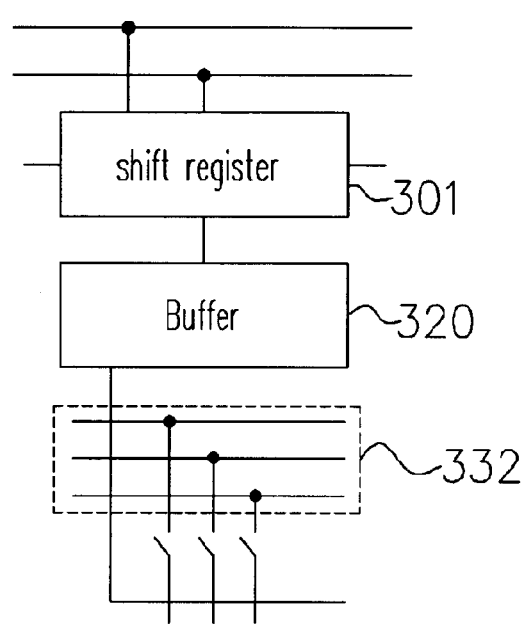
FIG. 3 schematically shows a diagram of a data driver unit of a data driver circuit of a preferred embodiment of the present invention.
Figure 4:
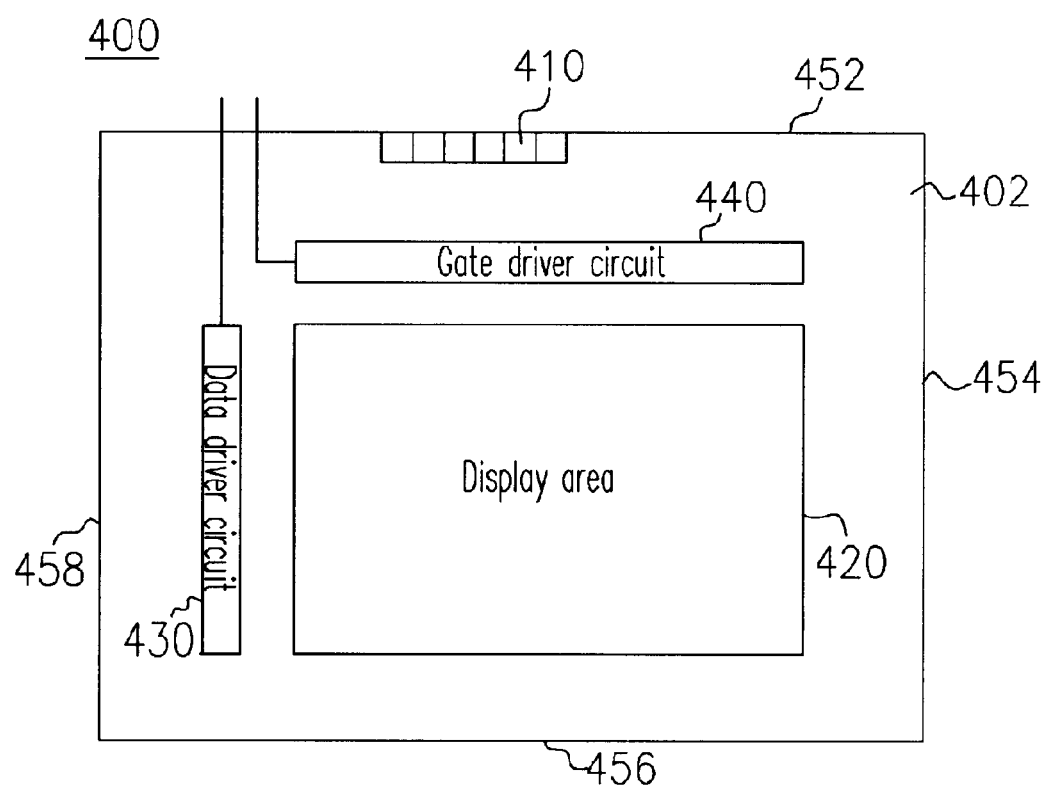
FIG. 4 schematically shows a configuration diagram of a conventional display panel with the integrated driver circuit.

Referring to FIG. 3, it schematically shows a diagram of a data driver unit of a data driver circuit of a preferred embodiment of the present invention. As shown in FIG. 3, the data driver unit comprises a shift register 310, a buffer 320, a RGB signal bus 332, and analog switches 340.

In the present embodiment, after an activating signal issued by the data driver circuit is supplied to the shift register 310, the shift register 310 issues a control signal to the buffer 320 according to the activating signal, and enables the analog switches 340 via the buffer 320, so that the pictures and colors expected to be displayed are displayed in the display area.

In summary, the display panel with the integrated driver circuit provided by the present invention is designed to dispose the liquid crystal injection hole and the data driver circuit on different sides, so as to increase the space and the flexibility of the display panel design.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A display panel with an integrated driver circuit, comprising:
   an array substrate;
   a plurality of peripherals comprising a first peripheral area along a first side, a second peripheral area along a second side, a third peripheral area along a third side, and a fourth peripheral area along a fourth side;
   a liquid crystal injection hole for injecting a liquid crystal, disposed on the fourth peripheral area of the array substrate;
   a first driver circuit disposed on the adjacent edge of the first peripheral area and the second peripheral area of the array substrate;
   a second driver circuit disposed on either the third peripheral area of the array substrate or disposed on the third peripheral area of the array substrate and part of the first peripheral area where the first driver circuit is not disposed on; and
   a display area comprising a plurality of the data lines and a plurality of gate lines that are perpendicularly crossed with each other.

2. The display panel with the integrated driver circuit of claim 1, wherein the first driver circuit is a data driver circuit, and the second driver circuit is a gate driver circuit.

3. The display panel with the integrated driver circuit of claim 2, wherein the first driver circuit is the gate driver circuit, and the second driver circuit is the data driver circuit.

4. The display panel with the integrated driver circuit of claim 2, wherein the data driver circuit is disposed outside of a range formed by the liquid crystal injection hole and the display area.

5. The display panel with the integrated driver circuit of claim 2, wherein the data driver circuit comprises a plurality of data driver units, so as to drive the data lines corresponded to the display unit, respectively.

6. The display panel with the integrated driver circuit of claim 2, wherein the gate driver circuit comprises driving the gate lines on the display unit, respectively.

7. The display panel with the integrated driver circuit of claim 1, wherein the array substrate is a rectangle.

8. The display panel with the integrated driver circuit of claim 1, wherein the first driver circuit is disposed on part of the second peripheral area.

9. The display panel with the integrated driver circuit of claim 1, wherein the second driver circuit is disposed on part of the first peripheral area.

10. The display panel with the integrated driver circuit of claim 1, wherein the second driver circuit is disposed on part of the third peripheral area.

11. The display panel with the integrated driver circuit of claim 1, wherein the display area is an active matrix driving display area.

12. The display panel with the integrated driver circuit of claim 1, wherein the display panel is a LCD panel.

13. The display panel with the integrated driver circuit of claim 1, wherein the array substrate is an isolating substrate.

* * * * *